United States Patent
Fujimaki et al.

(10) Patent No.: US 6,898,157 B2
(45) Date of Patent: May 24, 2005

(54) OPTICAL HEAD HAVING A PLURALITY OF COIL ELEMENTS CONNECTED IN PARALLEL TO EACH OTHER

(75) Inventors: Tohru Fujimaki, Kawasaki (JP); Koji Matsumoto, Kawasaki (JP); Koichi Tezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 10/400,263

(22) Filed: Mar. 27, 2003

(65) Prior Publication Data

US 2004/0027929 A1 Feb. 12, 2004

Related U.S. Application Data

(62) Division of application No. 09/448,783, filed on Nov. 24, 1999, now Pat. No. 6,567,347.

(30) Foreign Application Priority Data

Mar. 19, 1999 (JP) ............................. 11-76795

(51) Int. Cl.[7] ........................ G11B 11/00; G11B 7/135
(52) U.S. Cl. .............................. 369/13.33; 369/112.23; 369/13.17; 369/300; 29/603.23
(58) Field of Search .................... 369/13.23, 300, 369/13.33; 29/603.23

(56) References Cited

U.S. PATENT DOCUMENTS

| | | | |
|---|---|---|---|
| 3,649,779 A | 3/1972 | Burton | |
| 4,300,022 A | 11/1981 | Hastings-James et al. | |
| 5,004,307 A | 4/1991 | Kino et al. | |
| 5,105,408 A | * 4/1992 | Lee et al. | 369/44.15 |
| 5,124,961 A | 6/1992 | Yamaguchi et al. | |
| 5,150,338 A | 9/1992 | Birecki et al. | |
| 5,334,937 A | 8/1994 | Peck et al. | |
| 5,615,183 A | * 3/1997 | Ishii | 369/13.23 |
| 5,689,480 A | 11/1997 | Kino | |
| 5,793,571 A | * 8/1998 | Jurgenson et al. | 29/603.23 |
| 5,859,814 A | 1/1999 | Kino et al. | |
| 6,028,285 A | 2/2000 | Khater et al. | |
| 6,044,041 A | 3/2000 | Ishizaki et al. | |
| 6,069,853 A | 5/2000 | Novotny et al. | |
| 6,130,864 A | 10/2000 | Burroughs | |
| 6,154,326 A | 11/2000 | Ueyanagi et al. | |
| 6,298,018 B1 | 10/2001 | Takahashi et al. | |
| 6,351,436 B1 | 2/2002 | Mallary | |

FOREIGN PATENT DOCUMENTS

| | | |
|---|---|---|
| EP | 57066532 | 4/1982 |
| EP | 341 829 | 11/1989 |
| EP | 10112036 | 4/1998 |
| JP | 02018720 | 1/1990 |
| JP | 04299058 | 10/1992 |
| WO | 98/48418 | 10/1998 |
| WO | 99/23648 | 5/1999 |

* cited by examiner

*Primary Examiner*—A M Psitos
(74) *Attorney, Agent, or Firm*—Greer, Burns & Crain, Ltd.

(57) ABSTRACT

A coil assembly includes a coil arranged around a vertical axis, and a supporting member for carrying the coil. The supporting member is formed with a through hole corresponding to the vertical axis. The coil includes a plurality of coil elements which are connected in parallel.

5 Claims, 11 Drawing Sheets

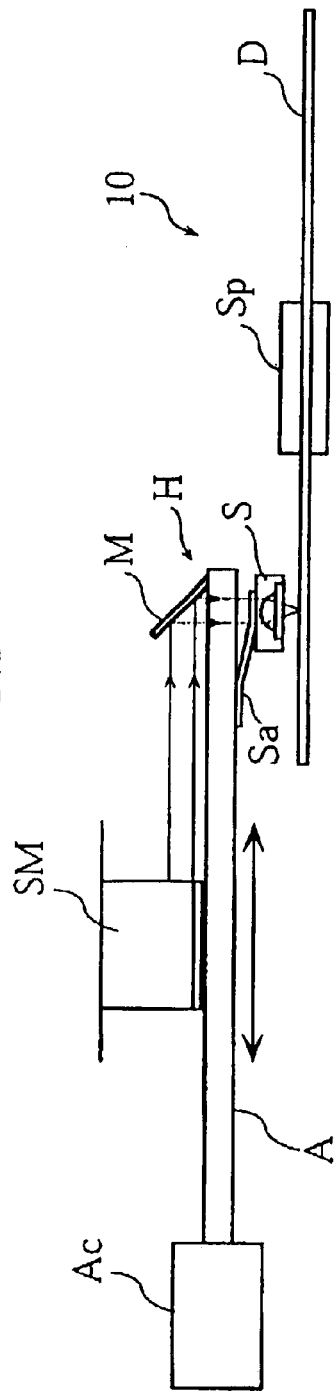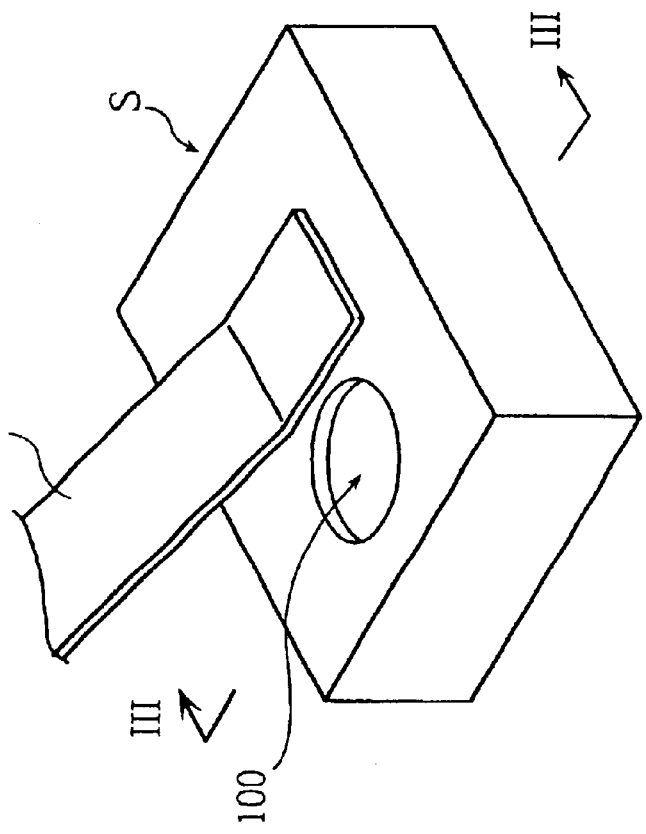

OPTICAL HEAD HAVING A PLURALITY OF COIL ELEMENTS CONNECTED IN PARALLEL TO EACH OTHER

This is a divisional of application Ser. No. 09/448,783, filed Nov. 24, 1999 now U.S. Pat. No. 6,567,347.

BACKGROUND OF THE INVENTION

1. Field of the Invention

The present invention relates to an optical head which is capable of both forming a laser spot at the magnetic layer of a magneto-optical disk and supplying an external magnetic field to the magnetic layer of the magneto-optical disk. The present invention also relates to a coil assembly used for such an optical head.

2. Description of the Related Art

Conventionally, various kinds of magneto-optical disk apparatus have been used for writing and reading data in and from a magneto-optical disk. Taking a data-reading method by MSR (magnetically induced super resolution) for example, use may be made of a magneto-optical disk which includes laminated magnetic layers whose magnetic characteristics may vary depending upon temperature. Data stored in such a disk is read out from a region, within a laser spot, which is heated up to a particular temperature by a laser beam. For reading out data from the disk, a magnetic field needs to be supplied to an area corresponding to the laser spot.

To write desired data in the magneto-optical disk, the recording layer of the disk will be irradiated by a laser beam, while being supplied with an external magnetic field. When a region of the recording layer is heated up to or above the Curie temperature by the laser beam, the direction of magnetization in the region may be reversed, meaning that data is stored. For reversing the direction of magnetization, use may be made of e.g. a light modulation method or a magnetic field modulation method. In either way, it is necessary to provide appropriate means for generating an external magnetic field for performing data-recording.

As understood from the above, an apparatus used for writing data in a magneto-optical disk and reading out data therefrom needs to be provided with at least two functions; a first function for forming a laser spot on the surface of the disk, and a second function for generating an external magnetic field to perform the recording or reading of data. For the first function, an optical head is used, while for the second function, a magnetic head is used.

An optical head and a magnetic head may be located separately. Specifically, the former may be arranged in facing relation to the recording surface of the disk (i.e., on the side of the transparent substrate), whereas the latter may be arranged in facing relation to the opposite (back) surface of the disk.

Alternatively, an optical head and a magnetic head may be integrated into a single unit. An example of such a unit is disclosed in JP-A-2(1990)-18720. Referring to FIGS. 17–20 of the present application, the conventional unit (optical head) disclosed in this Japanese document will now be described below.

As shown in FIG. 17, the conventional apparatus includes a spindle (Sp) for rotating a magneto-optical disk (D) attached thereto, an arm (A) movable in radial directions of the disk (D), a mirror (M) mounted on an end of the arm (A), and a slider (S) supported by the arm (A) via a suspension arm (Sa). The slider (S) is provided with an objective lens (L), as shown in FIG. 18, and a coil block (Cb) disposed immediately under the objective lens (L).

As shown in FIG. 18, the coil block (Cb) includes a supporting base (B) and a coil (C) formed on the bottom surface of the supporting base (B). The supporting base (B), which may be made of silicon, is formed with a through hole (a) which resembles a reversed truncated pyramid. The through hole (a) is provided for allowing the passage of a laser beam converged by the objective lens (L). After passing through the hole (a), the converged laser beam reaches the disk (D) and forms a bright spot (Ls) on the disk.

The coil (C) arranged on the bottom surface of the supporting base (B) may be formed by printing a selected pattern of a conductive material on the bottom surface of the supporting base (B). As shown in FIG. 20, the coil (C) surrounds the aperture of the through hole (a) that is open in the bottom surface of the supporting base (B). The through hole (a) is arranged to positionally correspond to the nominal optical axis of the objective lens (L).

As shown in FIG. 17, the arm (A) is caused to move radially of the disk (D) by a linear actuator (Ac) such as a voice coil motor. When the apparatus is not operated, the slider (S) is elastically urged to the disk surface by the suspension arm (Sa) to be held in pressed contact with the disk (D). On the other hand, when the disk (D) is caused to rotate at high speed, the slider (S) will float slightly above the disk (D) by a fluid wedge formed between the slider (S) and the disk (D).

As shown in FIG. 17, the conventional apparatus further includes a stationary module (SM) incorporating a laser emitting unit, a detector, a collimator and so on. In operation, a laser beam is emitted from the module (SM) to travel along the arm (A). Then, the laser beam is reflected by the mirror (M) to go along a path perpendicular to the previous path. Consequently, the laser beam enters the objective lens (L) and is converged by the lens. Consequently, a predetermined laser spot (Ls) is formed on the disk (D).

In the conventional apparatus described above, the coil (C) is disposed so adjacent to the disk (D) as to surround the laser spot (Ls). Thus, a magnetic field needed for performing data-recording or data-reading will be properly applied to a region corresponding to the laser spot (Ls) on the disk (D). However, the conventional apparatus has been found disadvantageous in the following point.

As shown in FIG. 18, the coil (C) of the conventional optical head is not provided with a core. With such an arrangement, the magnetic field to be generated by the coil (C) is rendered weaker than the magnetic field to be generated by a coil provided with a core having a high magnetic permeability.

One way to strengthen the magnetic field to be generated by a coil is to increase the number of turns of the coil. However, as the number of the turns of the coil is increased, the resistance of the coil may unfavorably become greater. In such a case, a higher voltage should be supplied to the coil for causing the coil assembly to work properly. Further, a coil with an increased number of turns may fail to provide an expected response as the voltage frequency supplied to the coil becomes higher. Clearly, it is disadvantageous to use such a coil as an external magnetic field generating means for performing recording of data by magnetic field modulation.

SUMMARY OF THE INVENTION

The present invention has been proposed under the above circumstances. The first objective of the present invention is to provide a coil assembly which is capable of providing a required external magnetic field to a magneto-optical disk, wherein the number of turns of the coil is substantially increased without causing the resistance of the coil to become greater. The second objective of the present invention is to provide an optical head which includes both an objective lens for forming a laser spot on a magneto-optical recording medium and a coil for applying an external magnetic field to the magneto-optical recording medium, wherein a suitably arranged core having a high magnetic permeability is used for improving the magnetic field generated by the coil.

According to a first aspect of the present invention, there is provided a coil assembly comprising:

a coil arranged around a predetermined axis; and a supporting member for carrying the coil, the supporting member being formed with a through hole corresponding to the predetermined axis;

wherein the coil includes a plurality of coil elements connected in parallel.

Preferably, each coil element may have a circular configuration about the predetermined axis.

When each coil element has a circular configuration about a predetermined axis, the following advantage is obtainable. It is now supposed that the number of turns of a coil is equal to "n" and the resistance of each coil element is equal to "r". In these conditions, the overall resistance Ra of a conventional coil (in which the coil elements are connected in series to provide a single wire) is equal to "r×n."

According to the present invention, on the other hand, the overall resistance Rb of a coil is equal to "r/n", which is smaller than in the above case. Thus, the voltage to be applied to the coil can be made comparatively lower. Further, since the inductance of the coil is also made lower, it is possible to obtain excellent frequency characteristics when the coil assembly is used as an external magnetic field generating means for performing data-recording by a magnetic field modulation method. This means that magnetic field modulation can be properly performed even in a higher range of frequency. Accordingly, the data-recording density for a magneto-optical disk can be further increased.

According to a preferred embodiment, at least part of the coil elements may be concentrically arranged in a common plane. With such an arrangement, the coil assembly can be reduced in thickness.

According to another preferred embodiment, at least part of the coil elements may be spaced from each other along the predetermined axis. With such an arrangement, the outer diameter of the coil can be reduced, which is advantageous in increasing the strength of the magnetic field to be generated.

According to another preferred embodiment, each coil element may have a whirling or spiral configuration, and the through hole of the supporting member may have a circular or polygonal cross section. Corresponding to the through hole, the coil supporting member may have a circular or polygonal configuration. In this embodiment, each coil element is similar to the conventional coil. However, since the coil elements of the present invention are connected in parallel, the same advantages as described above in connection with the previous embodiments are obtained. (It should be noted that the overall resistance Rc of the coil is equal to "r1/n1", when each coil element has the same resistance of r1 and the total number of the coil elements is "n1.")

Preferably, the whirling (or spiral) coil elements may be spaced from each other in the lengthwise direction of the predetermined axis. With such an arrangement, the number of turns of each coil element is advantageously increased. Accordingly, the strength of the magnetic field to be generated is increased.

According to a second aspect of the present invention, there is provided an optical head which incorporates a coil assembly (used as an external magnetic field generating means) according to the first aspect of the present invention.

The optical head comprises:

a carriage movable along a surface of a magneto-optical disk;

a suspension member attached to the carriage; and a slider attached to the suspension member to be brought into facing relation to the surface of the magneto-optical disk, the slider being provided with an objective lens and a coil assembly which includes a coil arranged around a predetermined axis and a supporting member for carrying the coil, the supporting member being formed with a through hole corresponding to the predetermined axis;

wherein the coil includes a plurality of coil elements connected in parallel, the through hole being arranged to correspond to an optical axis of the objective lens.

According to a preferred embodiment, the carriage may comprise an elongated arm movable in a radial direction of the magneto-optical disk. The elongated arm may be provided, at an end thereof, with a mirror for directing a laser beam toward the objective lens.

According to a third aspect of the present invention, there is provided an optical head comprising:

a carriage movable along a surface of a magneto-optical disk;

a suspension member attached to the carriage; and a slider attached to the suspension member to be brought into facing relation to the surface of the magneto-optical disk, the slider being provided with an objective lens and a coil assembly which is formed with a through hole corresponding to an optical axis of the objective lens;

wherein the optical head further comprises a magnetic member at least part of which is arranged in the through hole of the coil assembly.

With such an arrangement, the portion of the magnetic member arranged in the thorough hole may function as a core having a high magnetic permeability. Thus, as opposed to a coil assembly with no core, the coil assembly having the above arrangement can generate an external magnetic field of a greater power.

Preferably, the magnetic member may be transparent. With such an arrangement, the magnetic member does not prevent the laser beam from passing through the through hole. Thus, it is possible to fill the through hole with a core (the magnetic member) having a sufficiently high magnetic permeability.

Preferably, the objective lens may be made of a transparent magnetic material, and the magnetic member may be integrally formed with the objective lens. With such an arrangement, there is no need to separately prepare a magnetic member as a core for the coil, which is advantageous in reducing the number of necessary components.

According to a preferred embodiment, the magnetic member may comprise a magnetic layer located between the objective lens and the coil assembly.

Preferably, the magnetic member may be provided with a cylindrical portion arranged in the through hole of the coil assembly, and the cylindrical portion may be arranged to taper toward the magneto-optical disk.

Preferably, the objective lens may be provided with a tapering portion arranged in the through hole of the coil assembly. The tapering portion of the magnetic layer may be reflective and arranged to cover the tapering portion of the objective lens. With such an arrangement, the laser beam passing through the objective lens can effectively lead to the magneto-optical disk.

The magnetic member may be formed with a bent portion extending around a circumference of the coil assembly.

The objective lens as a whole may taper toward the magneto-optical disk, the objective lens having a diametrically smaller end arranged in the hole of the coil assembly.

The magnetic member may comprise a magnetic layer formed on a side surface of the objective lens. The magnetic layer may be produced by subjecting a magnetic metal to sputtering for example. In this manner, the magnetic layer can easily be formed on the side surface of the objective lens before the lens is fixed to the coil assembly. Thus, the assembling of the optical head is facilitated.

Advantageously, the magnetic layer may be rendered reflective. To produce such a reflective magnetic layer, use may be made of a reflective metal. With the use of a reflective magnetic layer, it is possible to prevent the laser beam from unduly leaking out via the side surface of the objective lens. Thus, a desired laser spot is properly formed on the magneto-optical disk.

Other objects, features and advantages of the present invention will become clearer from the following detailed description given with reference to the accompanying drawings.

BRIEF DESCRIPTION OF THE DRAWINGS

In the accompanying drawings:

FIG. 1 shows principal components of a magneto-optical disk apparatus using an optical head according to the present invention;

FIG. 2 is a perspective view showing a slider used for the apparatus of FIG. 1;

DETAILED DESCRIPTION OF THE PREFERRED EMBODIMENTS

Preferred embodiments of the present invention will be described below with reference to FIGS. 1–16 of the accompanying drawings.

Figure 3:
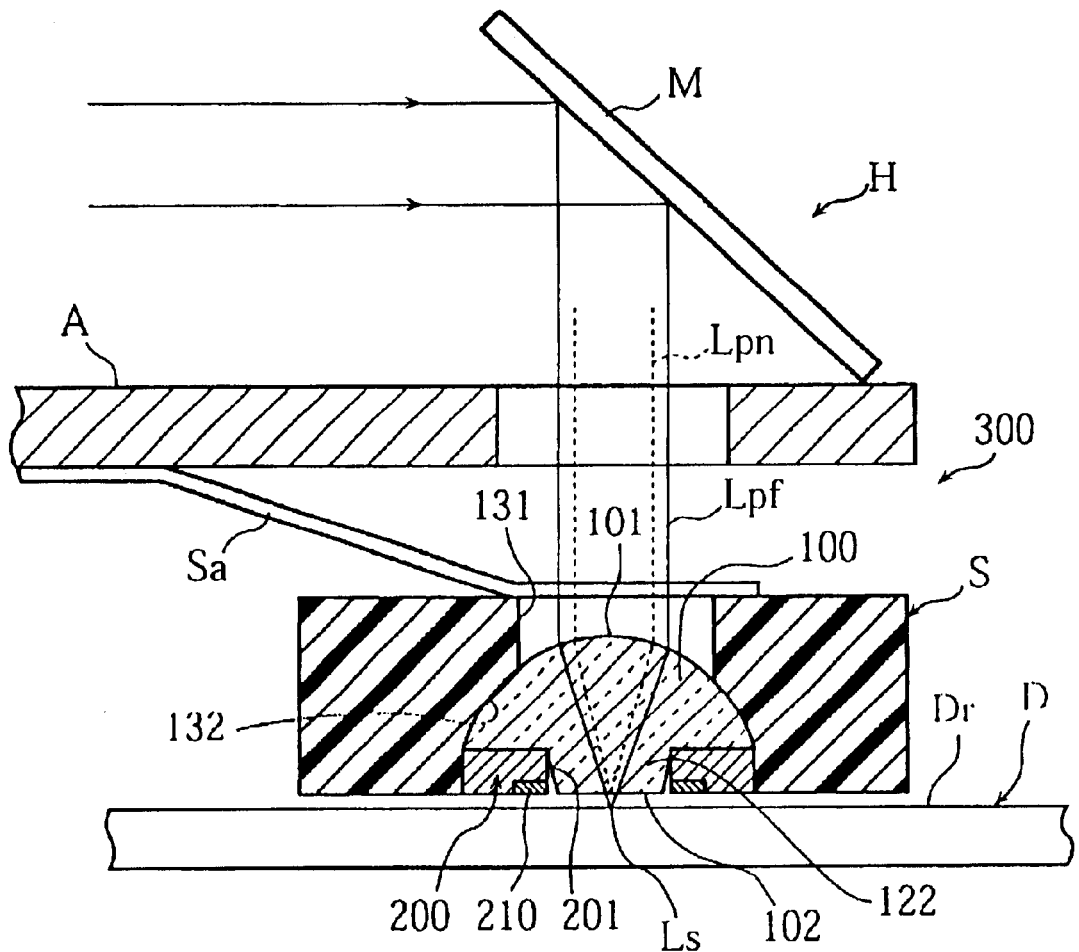
FIG. 3 is a sectional view taken along lines III—III in FIG. 2, showing an optical head according to a second aspect of the present invention.

Reference is first made to FIGS. 1–3 showing an example of optical head embodying the present invention and a magneto-optical disk apparatus incorporating the optical head.

As shown in FIG. 1, the magneto-optical disk apparatus (generally indicated by reference numeral 10) includes the following components. A magneto-optical disk (D) is attached to a vertical spindle (Sp) which is arranged to rotate at high speed. A supporting arm (A) serves as a movable carriage for carrying a head unit (H) provided at one end of the arm (A). For moving the arm (A) in radial directions of the disk (D), use is made of a linear actuator (Ac) connected to the arm (A). The linear actuator may be provided with a linear voice coil motor for actuating the arm (A) in a desired manner.

The head unit (H) includes a mirror (M) which is mounted on the arm (A) and a slider (S) which is supported by the arm (A) via a suspension member (Sa). The slider (S), as shown in FIG. 3, carries an objective lens 100 and a coil assembly 200 which is arranged below this lens in facing relation to the disk (D). The coil assembly 200 is formed with a center hole 201 for allowing passage of light converged by the lens 100. The center hole 201 may have a circular or polygonal cross section. Accordingly, the profile of the coil assembly 200 may be made circular or polygonal. The coil assembly 200 incorporates a coil 210 surrounding the converging light.

The slider (S) is held in pressing contact with the disk (D) by the suspension member (Sa) when the disk (D) is not rotated. In the operation of the apparatus, however, the slider (S) is kept floating above the rotating disk (D) by the action of a fluid wedge formed between the slider (S) and the disk (D). In this floating state, the slider (S) is held in slightly-spaced facing relation to the surface of the disk (D).

In the operation of the apparatus 10, a laser beam is emitted from a stationary module (SM) provided with a laser light generator, a detector, a collimator and so on. The emitted laser beam is reflected by the mirror (M) to be directed in a direction perpendicular to the initial traveling path. Then, the laser beam enters the objective lens 100 to be focused onto the disk (D). Thus, a laser spot (Ls) having a predetermined diameter is formed on the disk surface (see FIG. 3).

As shown in FIG. 3, the coil 210 is arranged close to the disk (D) to substantially surround the laser spot (Ls) With such an arrangement, an appropriate magnetic field needed for performing a data-writing or data-reading operation is generated in a region corresponding to the laser spot (Ls).

Reference is now made to FIGS. 4–8 illustrating a variety of coil assemblies according to a first aspect of the present invention. These coil assemblies are advantageously used for the coil assembly 200 shown in FIG. 3.

Figure 4:
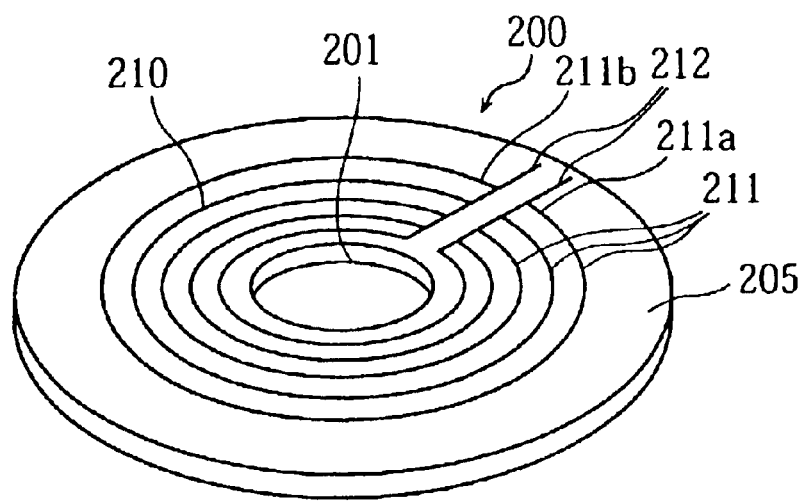
FIG. 4 shows a first example of coil assembly according to a first aspect of the present invention.

FIG. 4 shows a first example of coil assembly 200. The illustrated coil assembly has a circular coil supporting base 205 formed with a center hole 201. The surface of the supporting base 205 is provided with a coil 210 surrounding the hole 201.

The coil supporting base 205 may be a film-like member made of an insulating resin such as polyimide. The coil 210 may be produced in a manner such that a conductive material is printed, in the predetermined pattern, on the surface of the supporting base 205. Alternatively, a layer of conductive material is applied over the surface of the supporting base 205 and then subjected to photoetching to be made into the predetermined pattern.

As opposed to an ordinary coil, the coil 210 shown in FIG. 4 does not have a continuous whirling or spiral path for passing an electric current. Instead, the coil 210 is made up of plural coil elements 211 of different lengths. As illustrated, each coil element 211 makes a concentric circle substantially surrounding the center hole 201 of the base 205. Precisely, each coil element 211 makes an incomplete circle with a missing portion (an open circle) and has a first end 211a and a second end 211b. The first ends 211a of the respective coil elements 211 are connected in parallel by a common lead 212 extending radially of the base 205. Similarly, the second ends 211b are also connected in parallel by another common lead 212 extending radially of the base 205. Though not explicitly shown, an outer coil element 211 has a diameter greater than that of an inner coil element 211 so that the respective coil elements 211 have the same resistance. Thus, upon application of voltage, substantially the same amount of current will flow through each coil element 211.

When the same current flows through the respective coil elements 211, the strength of magnetic field to be generated by the coil 210 is proportional to the number of the coil elements 211. Thus, a desired magnetic field strength is obtainable by using a suitable number of coil elements 211.

As opposed to an ordinary coil (which has a single, spiral current path), the coil 210 of the first example includes coil elements 211 connected in parallel to each other. In this manner, the overall resistance of the coil 210 can be rendered smaller than that of the ordinary coil whose number of turns is equal to the number of coil elements 211 of the coil 210. Thus, the voltage to be applied on the coil 210 can be made relatively small. In addition, since the inductance of the coil 210 can also be relatively small, an improved frequency characteristic is obtainable for the coil assembly 200 used as an external magnetic field generator in a data-recording apparatus designed to operate on a magnetic field modulation system. With an improved frequency characteristic, magnetic field modulation of a high frequency is properly performed, which in turn makes it possible to increase the density of data storage in an magneto-optical disk.

Figure 5:
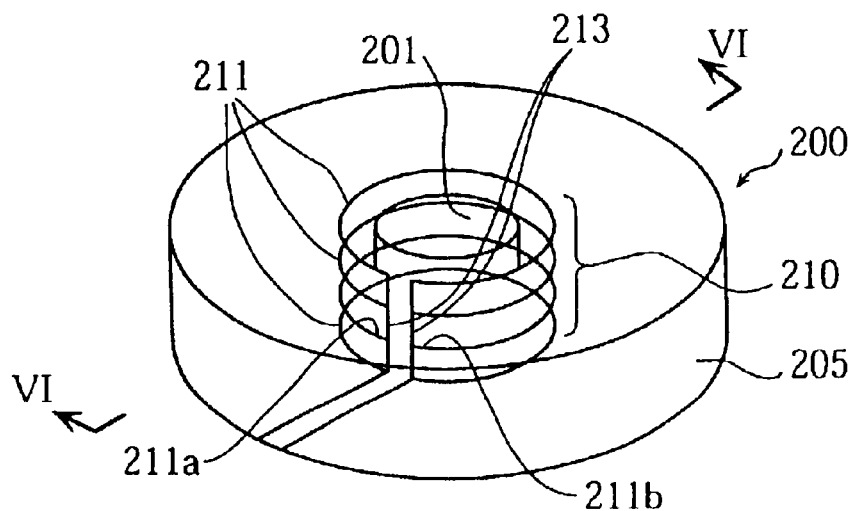
FIG. 5 shows a second example of coil assembly according to the first aspect of the present invention.

FIG. 5 shows a second example of coil assembly 200 which has the same advantages as those of the first example described above. In this instance again, use is made of a coil supporting base 205 formed with a center hole 201. A coil 210 is provided around the hole 201. The coil 210 is made up of plural coil elements 211 connected in parallel, as illustrated. As in the coil element of the above-described first example, each coil element 211 of the second example substantially runs around the center hole 201 but does not make a complete circle.

Differing from the first example, the coil elements 211 of the second example have the same diameter and are arranged vertically (i.e., along the axis of the center hole 201) at regular intervals. The coil 210 of the second example may be produced in the following manner.

Figure 6:
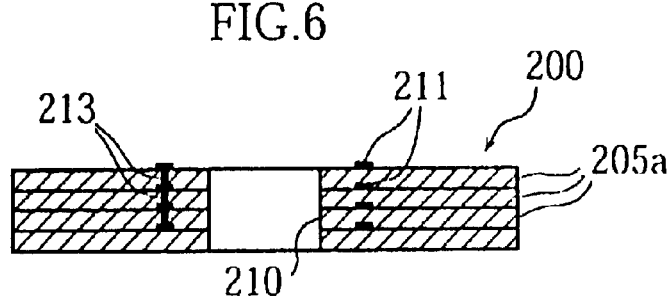
FIG. 6 is a sectional view taken along lines VI—VI in FIG. 5.

Referring to FIG. 6, a plurality of insulating films 205a are used. Each of the insulating films 205a may be made of a resin material such as polyimide. Each insulating film 205a is provided with a coil element 211 which may be made by printing a conductive material on the insulating film. Alternatively, the coil element 211 may be made by photoetching a conductive material applied on the insulating film 205. After formed with a coil element, the individual insulating films 205a are laminated, as shown in FIG. 6, to provide the coil supporting base 205. Then, first ends 211a of the respective coil elements 211 are connected to each other, while second ends 211b of the respective coil elements 211 are connected to each other. For providing such electrical connection, two vertical through-holes 213 are formed in the coil supporting base 205 at positions corresponding to the first and the second ends 211a, 211b. A conductive element is provided in each through-hole 213 for connecting the coil elements 211 in parallel.

Figure 7:
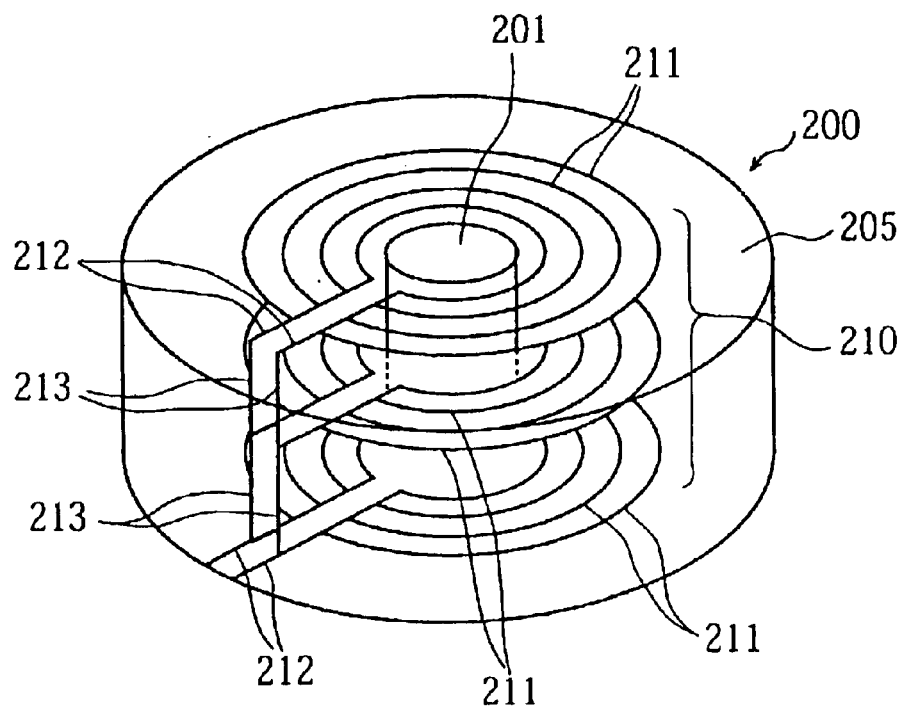
FIG. 7 is a perspective view showing an inner arrangement of a third example of coil assembly according to the first aspect of the present invention.

FIG. 7 shows a third example of coil assembly 200 which has the same advantages as those of the first example. The coil assembly 200 of the third example may be obtained by laminating plural coil units each of which has arrangements similar to those of the coil assembly of the first example (FIG. 4). Connection leads 212 disposed on the respective coil units are connected in parallel via through-holes 213 formed in the coil supporting base 205.

Figure 8:
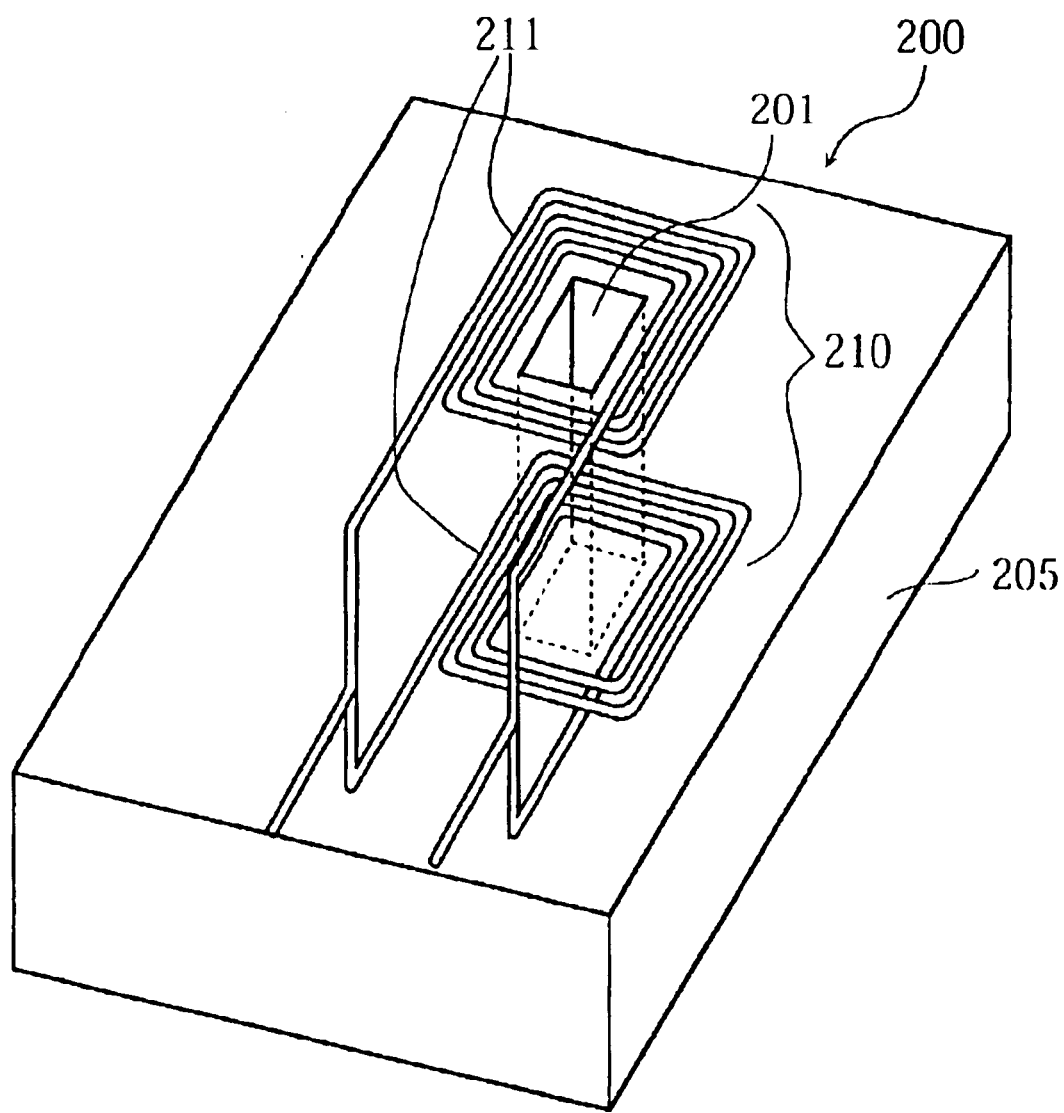
FIG. 8 is a perspective view showing the arrangement of a fourth example of coil assembly according to the first aspect of the present invention.

FIG. 8 is a fourth example of coil assembly 200. The illustrated coil assembly 200 includes a rectangular coil supporting base 205 formed with a vertical through hole 201 having a rectangular cross section. The coil assembly 200 also includes a coil 210 made up of vertically spaced coil elements 211 connected in parallel to each other. Each coil element 211 is a suitable length of conductive wire extending around the hole 201 in a whirling or spiral manner. The coil element 211 may be a copper wire insulated with a resin coating. Alternatively, the coil element 211 may be made of printed or photoetched conductive material.

In the fourth example described above, the hole 201 and the coil supporting base 205 are rectangular. However, the configuration of these components is not limited to this. For instance, the hole 201 and/or the coil supporting base 205 may have a circular or other polygonal cross section.

According to a second aspect of the present invention, an optical head 300 (FIG. 3) is provided which is advantageously used in the magneto-optical disk apparatus 10 (FIG. 1). The components of the optical head 300 may include the movable carriage or supporting arm (A), the suspension member (Sa) fixed to the carriage (A), and the slider (S) supported by the suspension member (Sa). The slider (S) is provided with the objective lens 100 and the coil assembly 200 according to the first aspect of the present invention. One of the technically significant features of the optical head 300 is that the center hole 201 of the coil assembly 200 positionally corresponds to the optical axis of the objective lens 100.

The slider (S) may be made of engineering plastics for example. As shown in FIG. 3, the slider (S) is formed with an upper hollow portion 131 which is upwardly open for introducing the laser beam; and a lower hollow portion 132 which is downwardly open for accommodating the objective lens 100. The upper and lower hollow portions 131, 132 communicate with each other for allowing the passage of the laser beam through the slider (S).

As shown in FIG. 3, the objective lens 100 has a convex upper surface 101 at which the laser beam enters the lens 100. The objective lens 100 also has a flat light-emitting surface 102 from which the laser beam leaves the lens 100. As illustrated, the light-emitting surface 102 is a surface of a downward protrusion 122 of the objective lens 100. The downward protrusion 122 is inserted into the center hole 201 of the coil assembly 200. In the illustrated example, the length of the downward protrusion 122 is equal to the depth of the center hole 201. Thus, when the downward protrusion 122 is completely inserted into the hole 201, the light-emitting surface 102 of the lens 100 is flush with the lower surface of the coil assembly 200.

In FIG. 3, a laser path (Lpf) depicted in solid lines represents a path of the laser beam when the so-called "far-field recording method" is employed, whereas a laser path (Lpn) depicted in broken lines represents a path of the laser beam when the so-called "near-field recording method" is employed. According to the former method, a laser spot (Ls) is to be formed on a recording layer (Dr) of the magneto-optical disk (D). According to the latter method, the laser beam entering the objective lens 100 is caused to converge at a focal point located within the lens 100 and adjacent to the light-emitting surface 102. In this case, near-field light (which is emitted from the above-mentioned focal point) is utilized for performing the recording or reading of data. In this regard, it should be noted that the light-emitting surface 102 of the lens 100 is flush with the lower surface of the coil assembly 200. With such an arrangement, the near-field recording can be properly performed.

In the example shown in FIG. 3, the coil 210 for generating an external magnetic field is arranged to surround the converging laser beam or the laser spot (Ls). In this manner, a suitable external magnetic field will be effectively applied to a region of the disk (D) where data-recording or data-reading is to be performed.

Reference is now made to FIGS. 9–16 illustrating basic arrangements of various kinds of optical heads according to a third aspect of the present invention. These optical heads (designated by reference numeral 400) are advantageously used for the magneto-optical disk apparatus 10 shown in FIG. 1.

Each of the optical heads 400 is provided with several components in common. Specifically, the common components include a movable carriage (not shown in FIGS. 9–16) arranged to move in parallel to the surface of a magneto-optical disk (D), a suspension member (not shown in FIGS. 9–16) fixed to the movable carriage, and a slider (S) supported by the suspension member. The slider (S) carries an objective lens 100 for focusing a laser beam, and a coil assembly 200 which is arranged immediately below the objective lens 100 in facing relation to the disk (D). The coil assembly 200 is formed with a center hole 201 corresponding in position to the optical axis of the objective lens 100.

One of the technically significant features of the optical heads 400 shown in FIGS. 9–16 is that a magnetic member 50 having a high magnetic permeability is provided in the center hole 201 of the coil assembly 200. The magnetic member 50 is arranged to allow the passage of a laser beam incident upon the objective lens 100. With such an arrangement, the external magnetic field generating function of the coil assembly 200 is advantageously improved, as compared to the conventional coil provided with no element corresponding to the magnetic member 50 of the present invention.

The coil assembly 200 shown in FIGS. 9–16 may not necessarily be any one of those shown in FIGS. 4–8 (the first aspect of the present invention). In other words, the coil assembly 200 may include an ordinary coil which is made by a length of conductive wire wound in continuous circles.

Figure 9:
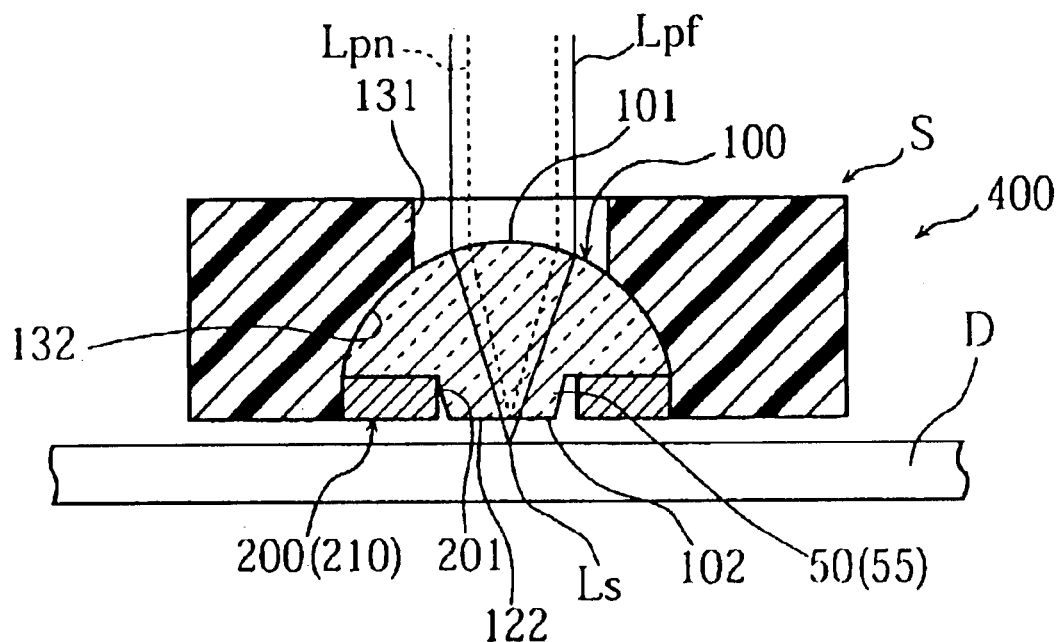
FIG. 9 is a sectional view showing a first example of optical head according to a third aspect of the present invention.

FIG. 9 shows the basic arrangement of a first example of optical head 400 according to the third aspect of the present invention. As seen from the figure, the arrangement of the illustrated optical head 400 is substantially similar to that of the optical head 300 according to the second aspect of the present invention (see FIG. 3). It should be noted, however, that the objective lens 100 of FIG. 9 is made of a transparent magnetic material, which is not the case with the optical head 300 of FIG. 3. The transparent magnetic material may preferably be magnetic garnet such as yttrium iron garnet ($Y_3Fe_5O_{12}$), ferrite ($Fe_3O_4$) and barium ferrite ($BaFe_{12}O_{19}$).

With the illustrated arrangement, the transparent downward protrusion 122 extends into the center hole 201 to serve as a magnetic core 55. In this way, as previously described, the function of the coil assembly 200 for generating an external magnetic field is advantageously improved. Further, as seen from FIG. 9, the upper surface of the coil assembly 200 is held in close contact with a bottom portion of the objective lens 100. With such an arrangement, it is possible to improve the path for the magnetic flux generated by the coil assembly 200, thereby increasing the external magnetic field provided by the coil assembly 200.

Figure 10:
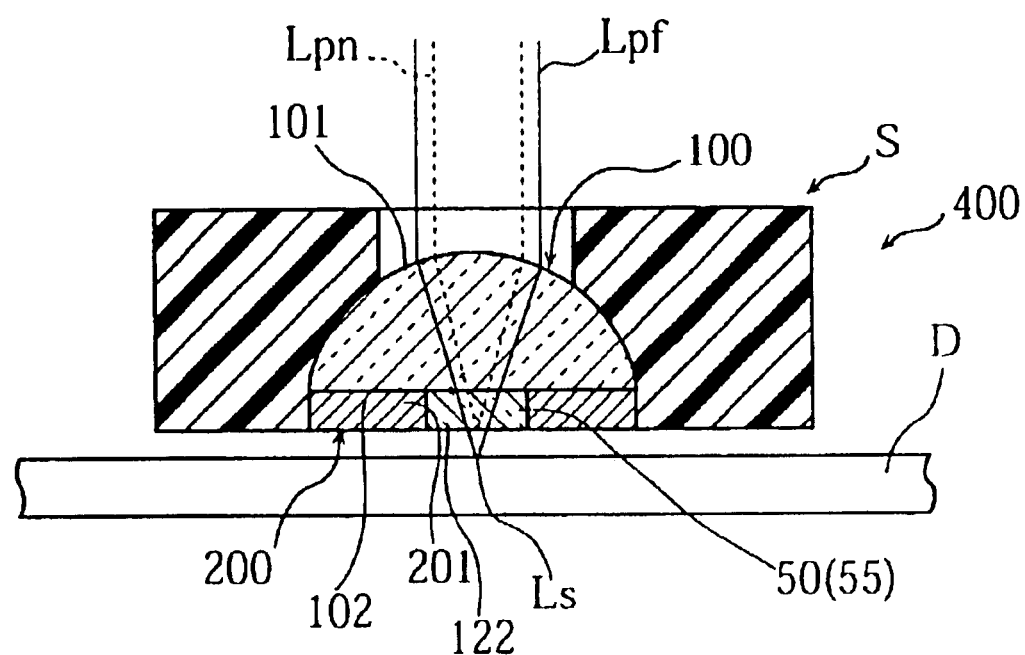
FIG. 10 is a sectional view showing a second example of optical head according to the third aspect of the present invention.

FIG. 10 shows a second example of optical head 400 according to the third aspect of the present invention. In this example, the objective lens 100 is made of anon-magnetic transparent material and has an entirely flat bottom surface 102. Below the lens 100, a core member 55 is provided in the center hole 201 of the coil assembly 200. The core member 55, which is made of a transparent magnetic material, is held in close contact with a predetermined portion of the bottom surface 102 of the lens 100. With such an arrangement, the core member 55 of magnetic material can intensify the magnetic field generated by the coil incorporated in the coil assembly 200.

Figure 11:
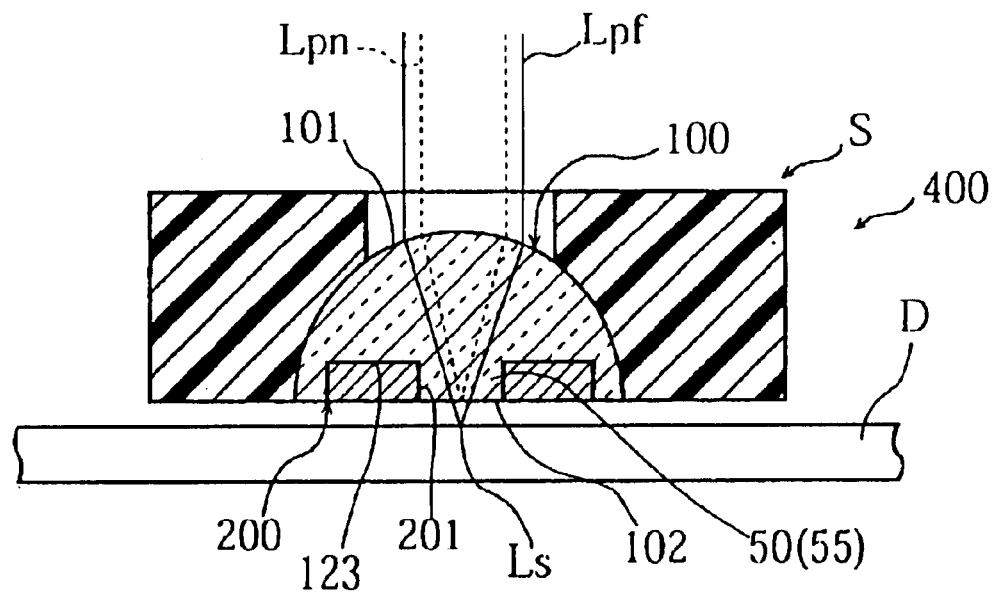
FIG. 11 is a sectional view showing a third example of optical head according to the third aspect of the present invention.

FIG. 11 shows a third example of optical head 400 according to the third aspect of the present invention. In this example, the objective lens 100 has a bottom surface 102 in which a continuous groove 123 is formed. The objective lens 100 is made of a transparent magnetic material. As viewed from below, the groove 123 extends in a circle, surrounding the downward protrusion 50 of the lens 100. A coil assembly 200 formed with a center hole 201 is fitted in the groove 123. In this state, the downward protrusion 50 is inserted into the hole 201 of the coil assembly 200, so that the light-emitting surface 102 of the lens 100 is flush with the bottom surface of the coil assembly 200. As illustrated, the coil assembly 200 is embedded into the bottom surface 102, with only its bottom surface exposed to the exterior. With such an arrangement, it is possible to further improve the path for the magnetic flux generated by the coil assembly 200. Accordingly, the external magnetic field provided by the coil assembly 200 can be intensified to a greater extent.

Figure 12:
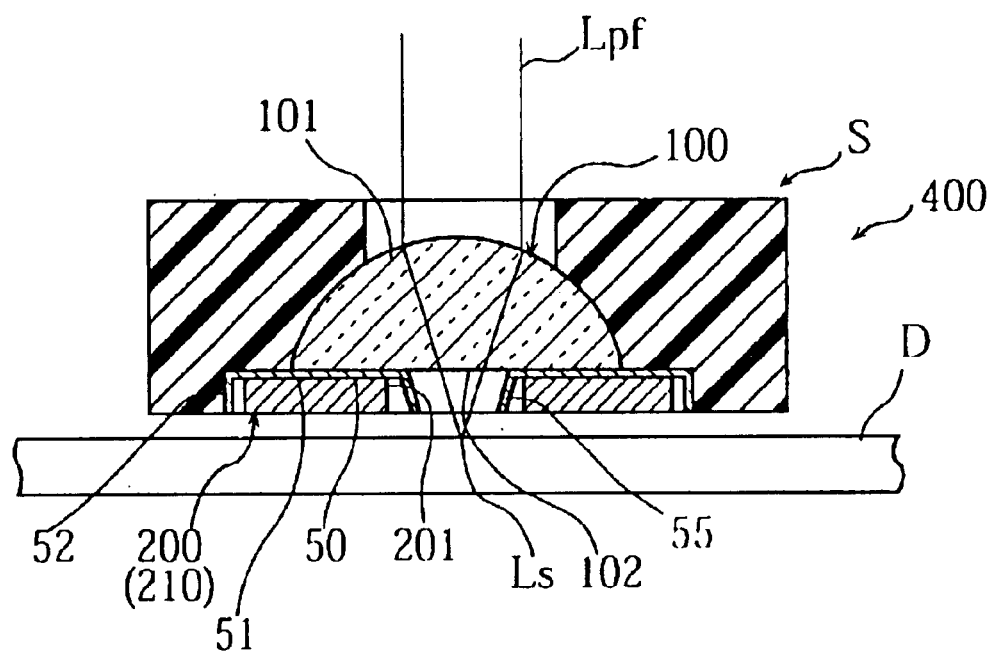
FIG. 12 is a sectional view showing a fourth example of optical head according to the third aspect of the present invention.

FIG. 12 shows a fourth example of optical head 400 according to the third aspect of the present invention. In this example, an objective lens 100 having an entirely flat bottom surface 102 is arranged above a coil assembly 200. Between the lens 100 and the assembly 200 is a magnetic member 50 which is a thin plate of magnetic metal. The magnetic member 50 has a downward protrusion 55 extending into the center hole 201. The protrusion 55 has a cylindrical configuration which tapers toward the disk (D). In this manner, it is possible to prevent the leaking of the laser beam.

As illustrated, the magnetic member 50 includes an intermediate portion 51 extending outward from the upper edge of the downward protrusion 55, and a cylindrical bent portion (outer wall) 52 extending around the circumferential surface of the coil assembly 200. In this fourth example, the downward protrusion 55 (serving as a core) is used for intensifying the magnetic field generated by the coil 210. In addition, since the magnetic member 50 is so arranged as to enclose the coil assembly 200 (except for the bottom surface of the assembly 200), an improved flux path is secured, which is advantageous in improving the external magnetic field generating function of the coil 210. The optical head 400 of FIG. 12 may preferably be used for performing data-recording and/or data-reading by a far-field recording method.

Figure 13:
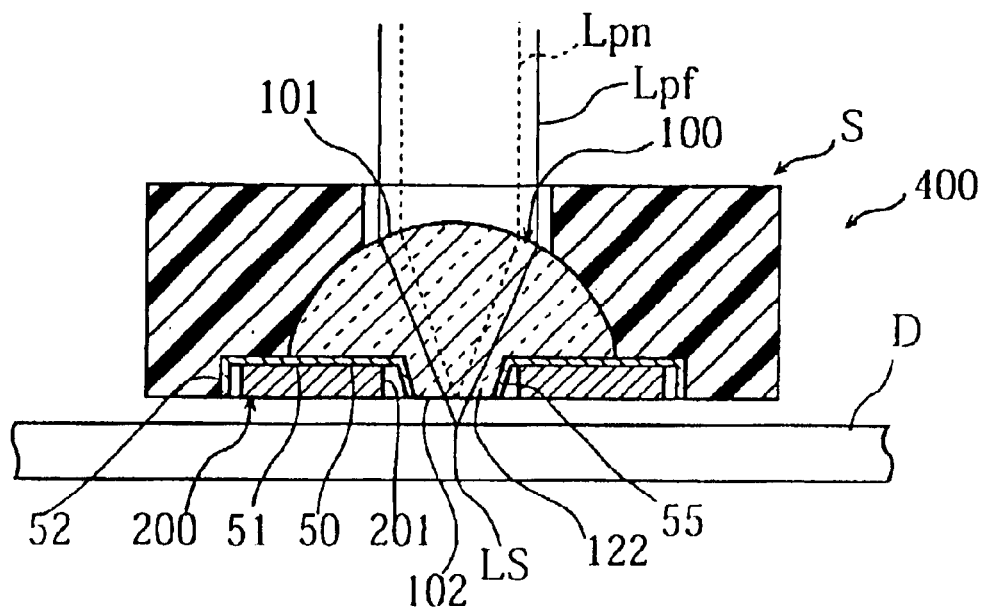
FIG. 13 is a sectional view showing a fifth example of optical head according to the third aspect of the present invention.

FIG. 13 shows a fifth example of optical head 400 according to the third aspect of the present invention. The illustrated optical head 400 is mostly similar to the optical head 400 of FIG. 12. The difference is that the objective lens 100 of the fifth example is formed with a downward protrusion 122 to be inserted into the center hole 201 of the coil assembly 200. As illustrated, the light-emitting surface 102 of the lens 100 is flush with the bottom surface of the coil assembly 200.

Figure 14:
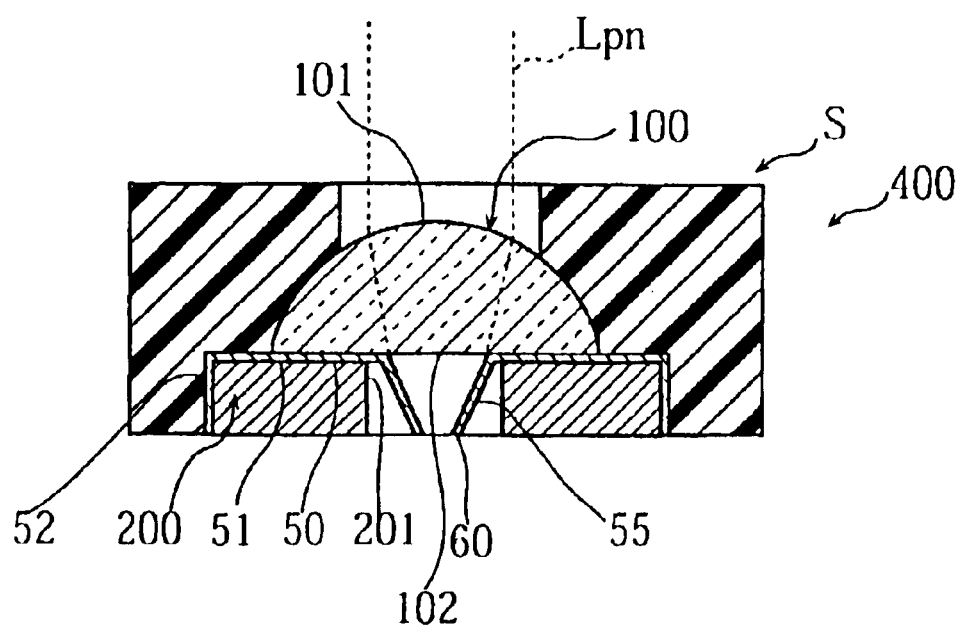
FIG. 14 is a sectional view showing a sixth example of optical head according to the third aspect of the present invention.

FIG. 14 shows a sixth example of optical head 400 according to the third aspect of the present invention. As readily seen, the illustrated optical head 400 is substantially similar to the optical head 400 of FIG. 12. However, it should be appreciated that the optical head 400 of FIG. 14 is significantly different from the optical head 400 of FIG. 12 in the following point.

Specifically, the lower end 60 of the tapering protrusion 55 of FIG. 14 is rendered much smaller in diameter than the counterpart of FIG. 12. Preferably, the inner diameter of the lower end 60 of FIG. 14 may be smaller than the wavelength of the laser beam utilized. It is also preferable that the inner surface of the tapering protrusion 55 may be made so reflective as to totally reflect the laser beam. With such an arrangement, the tapering protrusion 55 serves as a probe for additionally converging the laser beam which is converged in advance to some extent by the objective lens 100. The diffracted light of the laser beam emitted from the lower end 60 serves as the so-called "near-field light" to be used for writing data in the recording layer of the magneto-optical disk (D) or reading out data from the disk (D).

Figure 15:
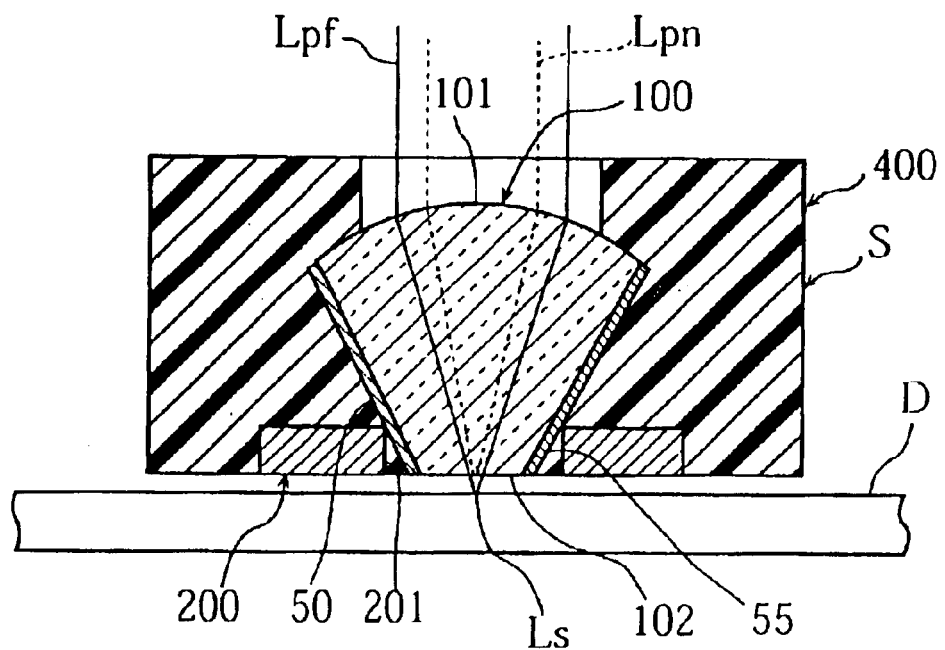
FIG. 15 is a sectional view showing a seventh example of optical head according to the third aspect of the present invention.

FIG. 15 shows a seventh example of optical head 400 according to the third aspect of the present invention. In this example, the objective lens 100 has a convex upper surface 101, an entirely flat lower surface 102 and a body located between these two surfaces. The body of the lens 100 tapers downward, so that the cross-sectional area of the body becomes smaller from the upper surface 101 to the lower surface 102. As illustrated, the body of the lens 100 has a side surface covered with a magnetic layer 50. The magnetic layer 50 may be formed by subjecting a magnetic material (e.g. an iron-chromium material) to vacuum evaporation, sputtering or plating for example.

In the seventh example, a lower portion of the objective lens 100 is inserted into the hole 201 of the coil assembly 200. Accordingly, a lower part of the magnetic layer 50 is also inserted into the hole 201, thereby serving as a core 55 for the coil of the coil assembly 200.

As shown in FIG. 15, both the objective lens 100 and the optical path (Lpf, Lpn) of the laser beam have a similar vertical cross section. In this manner, the objective lens 100 is advantageously reduced in size by dispensing with portions unusable for converging the laser beam. When the objective lens 100 is made of a transparent magnetic material, the magnetic layer 55 may be omitted.

Figure 16:
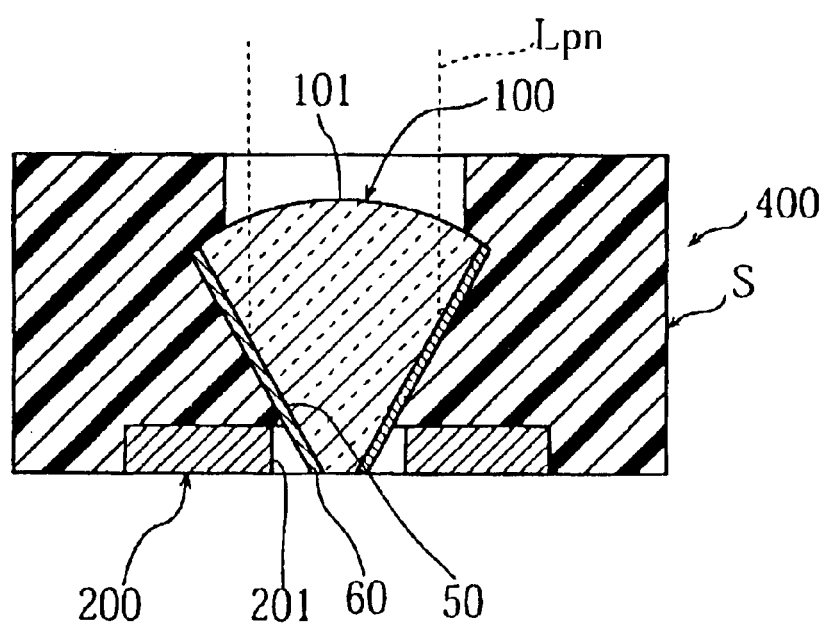
FIG. 16 is a sectional view showing an eighth example of optical head according to the third aspect of the present invention.
Figure 17:
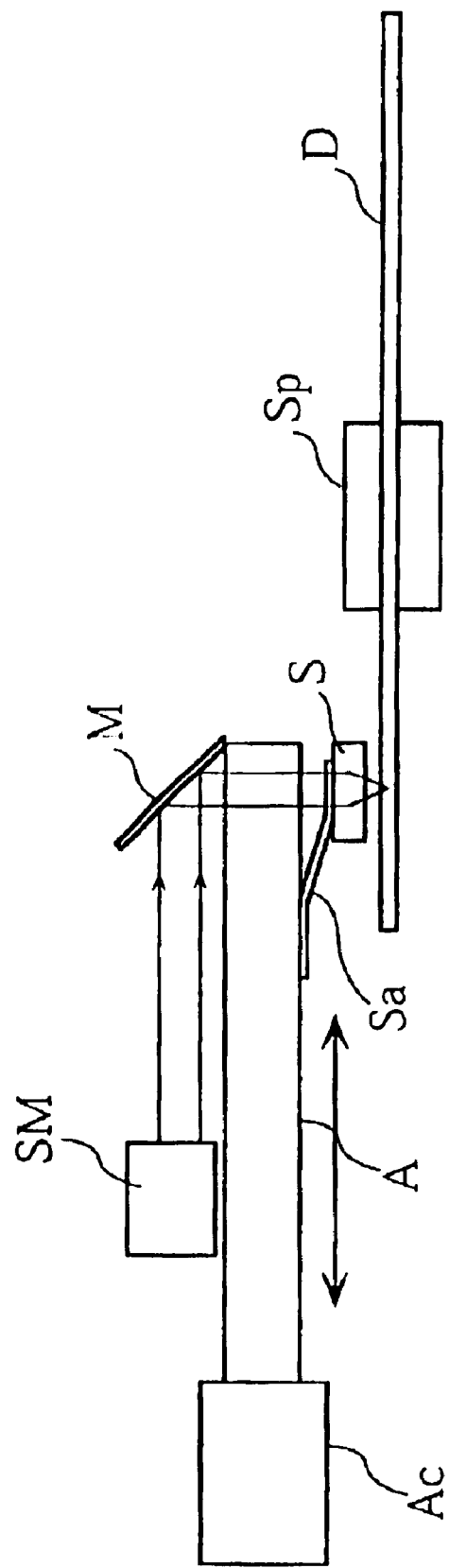
FIG. 17 shows principal components of a conventional optical head.
Figure 18:
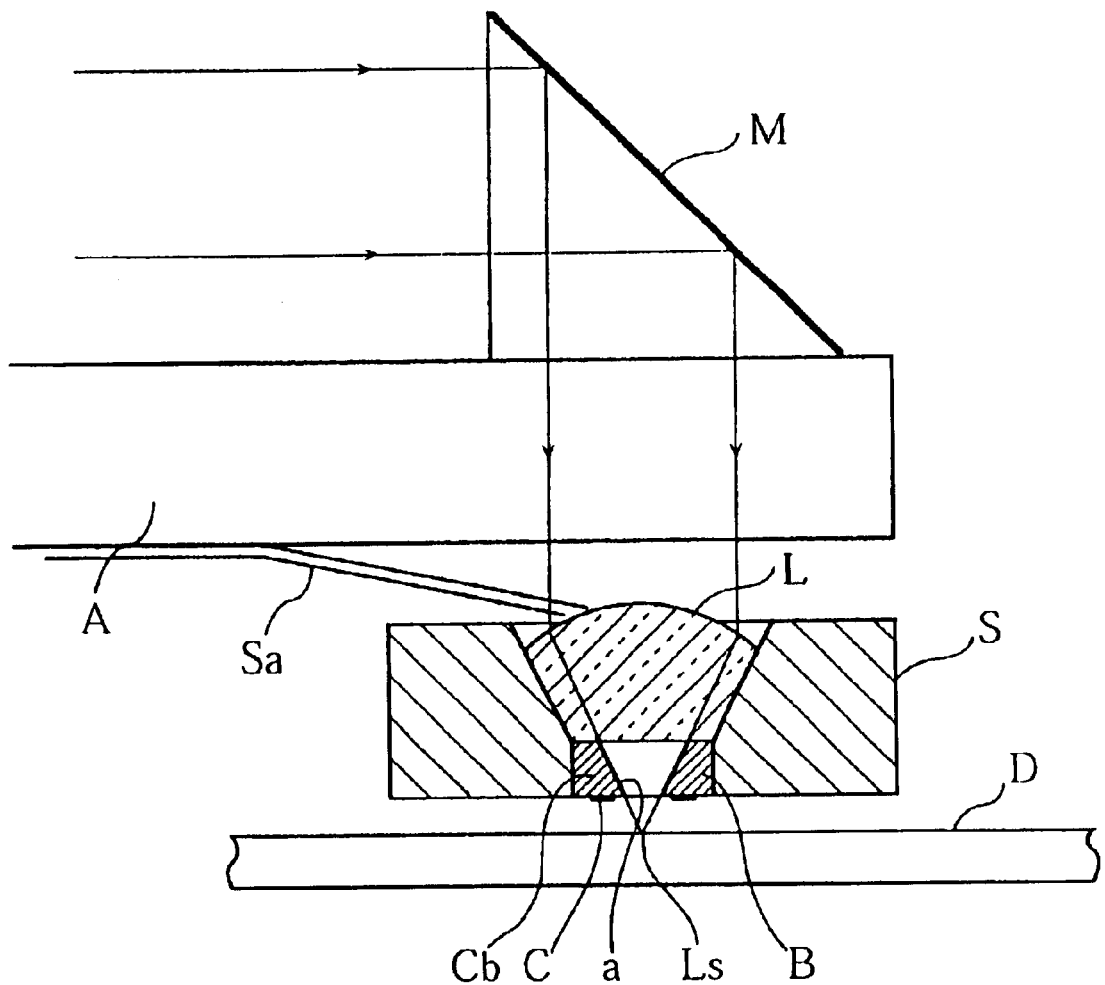
FIG. 18 is an enlarged view showing a principal part of the conventional optical head.
Figure 19:
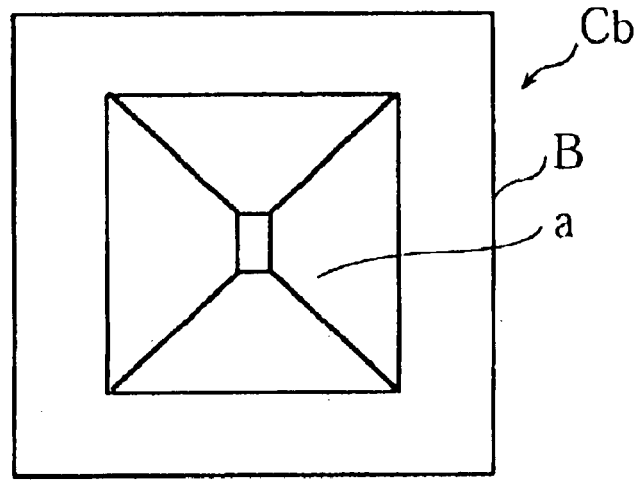
FIG. 19 is a plan view showing a conventional coil unit.
Figure 20:
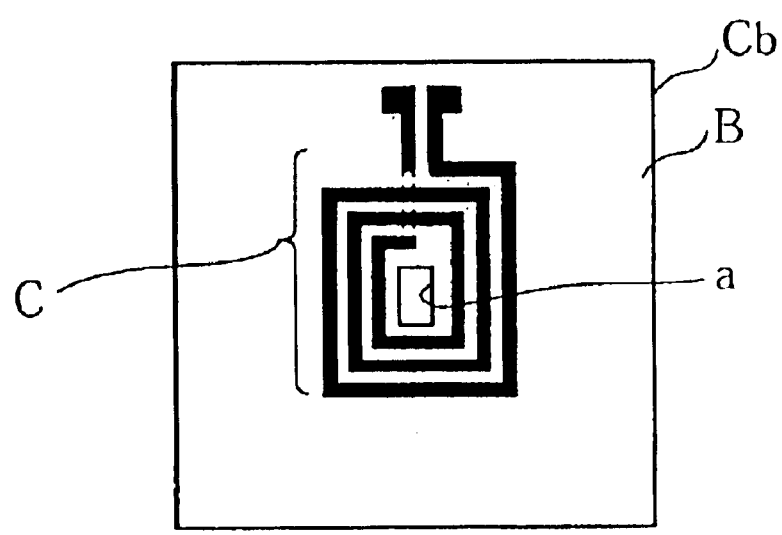
FIG. 20 is a bottom view showing the conventional coil unit.

FIG. 16 shows an eighth example of, optical head 400 according to the third aspect of the present invention. The basic arrangements of this example are mostly similar to those shown in FIG. 15. In the eighth example, however, the inner diameter of the lower end 60 of the magnetic layer 50 is much smaller than the counterpart of FIG. 15.

Preferably, the inner diameter of the lower end 60 of FIG. 16 may be smaller than the wavelength of the laser beam. Further, the inner surface of the magnetic layer 50 may be so reflective as to totally reflect the laser beam. In this manner, as previously described in reference to FIG. 14 (the sixth example), the near-field light emitted from the lower end 60 is utilized for writing data in the magneto-optical disk (D) or for reading out data from the disk (D).

The present invention being thus described, it is obvious that the same may be varied in many other ways. Such variations are not to be regarded as a departure from the spirit and scope of the present invention, and all such modifications as would be obvious to those skilled in the art are intended to be included within the scope of the following claims.

What is claimed is:

1. An optical head comprising:

a carriage movable along a surface of a magneto-optical disk;

a suspension member attached to the carriage; and a slider attached to the suspension member to be brought into facing relation to the surface of the magneto-optical disk, the slider being provided with an objective lens and a coil assembly which includes a coil arranged around a predetermined axis and a supporting member for carrying the coil, the supporting member being formed with a through hole corresponding to the predetermined axis;

wherein the coil includes a plurality of turns arranged around a predetermined axis, each turn of the coil having a first end and a second end spaced from the first end, the first ends of all turns of the coil being connected to a first common lead, the second ends of all turns of the coil being connected to a second common lead, the through hole being arranged to correspond to an optical axis of the objective lens.

2. The optical head according to claim 1, wherein the carriage comprises an elongated arm movable in a radial direction of the magneto-optical disk, the elongated arm being provided at an end thereof with a mirror for directing a laser beam toward the objective lens.

3. The optical head according to claim 1, wherein each turn of the coil has a circular configuration about the predetermined axis, at least selected turns of the coil being concentrically arranged in a common plane.

4. The optical head according to claim 1, wherein each turn of the coil has a circular configuration about the predetermined axis, at least one turn of the coil being spaced from the other turns of the coil along the predetermined axis.

5. The optical head according to claim 1, wherein the through hole of the supporting member has a circular cross section.

* * * * *